Jan. 8, 1963 R. J. PURTELL 3,072,268
IRRIGATION PIPE MOVING SYSTEM
Filed Nov. 25, 1960 3 Sheets-Sheet 1

RUFUS J. PURTELL
INVENTOR.

Jan. 8, 1963
R. J. PURTELL
3,072,268
IRRIGATION PIPE MOVING SYSTEM
Filed Nov. 25, 1960
3 Sheets-Sheet 2
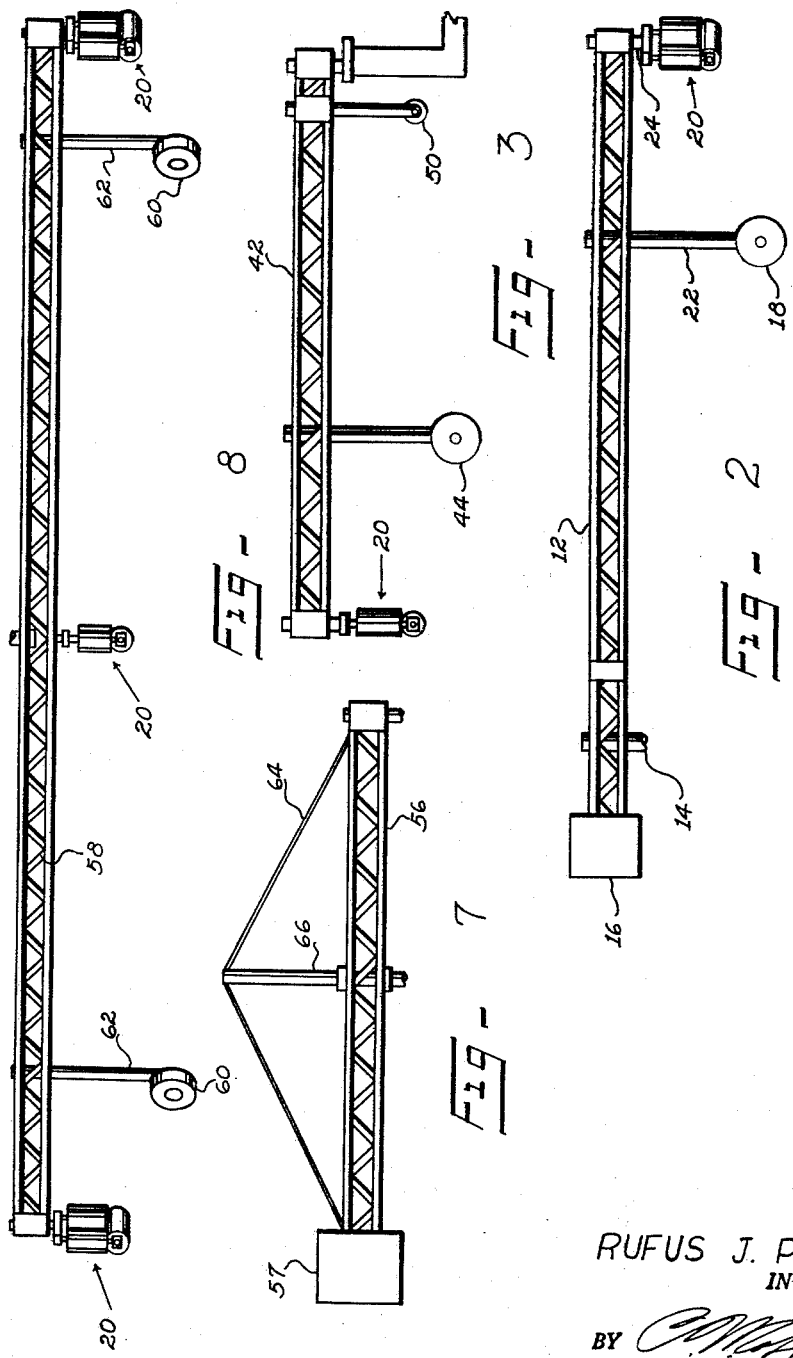
RUFUS J. PURTELL
INVENTOR.
BY
Atty.

Jan. 8, 1963 R. J. PURTELL 3,072,268
IRRIGATION PIPE MOVING SYSTEM
Filed Nov. 25, 1960 3 Sheets-Sheet 3
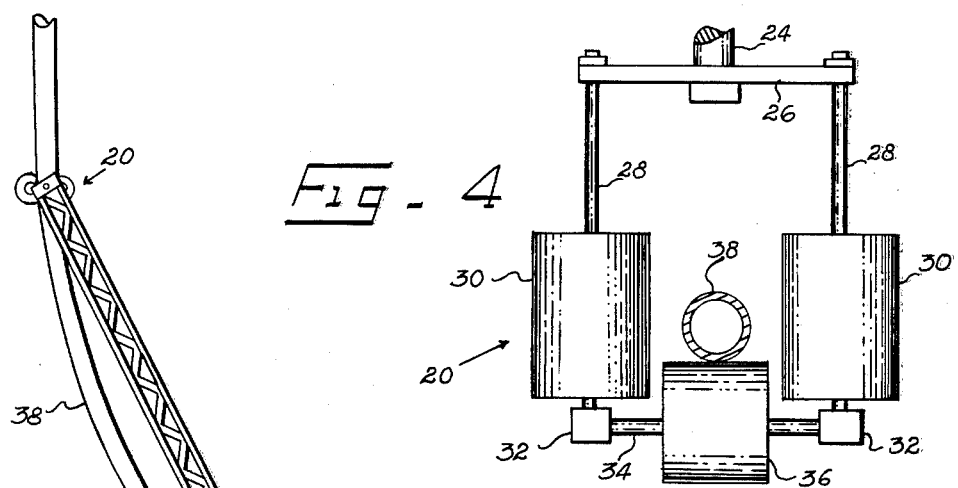
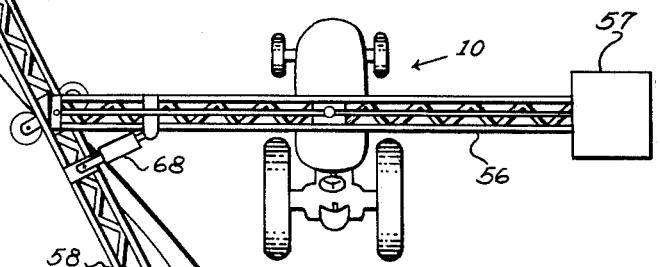
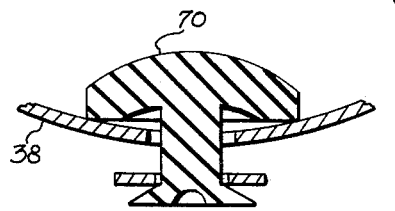
RUFUS J. PURTELL
INVENTOR.
BY
Atty.

United States Patent Office 3,072,268
Patented Jan. 8, 1963

3,072,268
IRRIGATION PIPE MOVING SYSTEM
Rufus J. Purtell, Brownfield, Tex., assignor to Robert B. Knight, J. B. Knight, and Jean Knight Jones, doing business as J. B. Knight Company, Brownfield, Tex.
Filed Nov. 25, 1960, Ser. No. 71,667
5 Claims. (Cl. 214—1)

This invention pertains to moving an agricultural irrigation pipe line system.

This invention pertains to a different system for achieving the same object as my prior co-pending applications each of the same title, filed September 11, 1958, Ser. No. 760,469, now Patent No. 3,009,646, the other filed April 19, 1960, Ser. No. 26,636.

As taught by my prior patent applications, an advantageous method of moving this type pipe is to have the pipe resting on the ground while it is watering, then when it is to be moved to empty the water from the pipe, raise the pipe, move it to the new location. The previous patent applications described systems wherein the entire line as a unit is raised simultaneously, the entire line moved simultaneously, and the entire line set down simultaneously.

According to this patent application, a system is disclosed wherein the line is progressively raised, moved to a new location, and set down at the new location.

An object of this invention is to move agricultural irrigation pipe from a first position to a second position parallel to the first.

Another object of this invention is to move pipe as described above with a machine which is not permanently attached to the pipe so that a single machine may be used with a plurality of systems.

Another object of this invention is to provide a machine to progressively pick up irrigation pipe, move it to a new location, and lower it at the new location.

A further object of this invention is to provide attachment which may be attached to a conventional farm tractor so that it may be utilized to move agricultural irrigation pipe.

Still further objects of this invention are to provide a system of booms with roller guides at the end of each boom which may be attached to a conventional farm tractor so that the tractor may be utilized in moving irrigation pipe lines.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawings, the different views of which are not necessarily to the same scale, in which:

FIG. 2 is an elevational view of the forward boom of the embodiment shown in FIG. 1.

FIG. 3 is an elevational view of the trailer of the embodiment of the view in FIG. 1.

FIG. 4 is a detail of a roller guide as used in this invention.

FIG. 5 is a detail of the valve by which the water is emptied from the pipe.

FIG. 6 is a plan view of a second embodiment.

FIG. 7 is an elevational view of the boom of the embodiment shown in FIG. 6.

FIG. 8 is an elevational view of the beam of the embodiment of FIG. 6.

Figure 1:
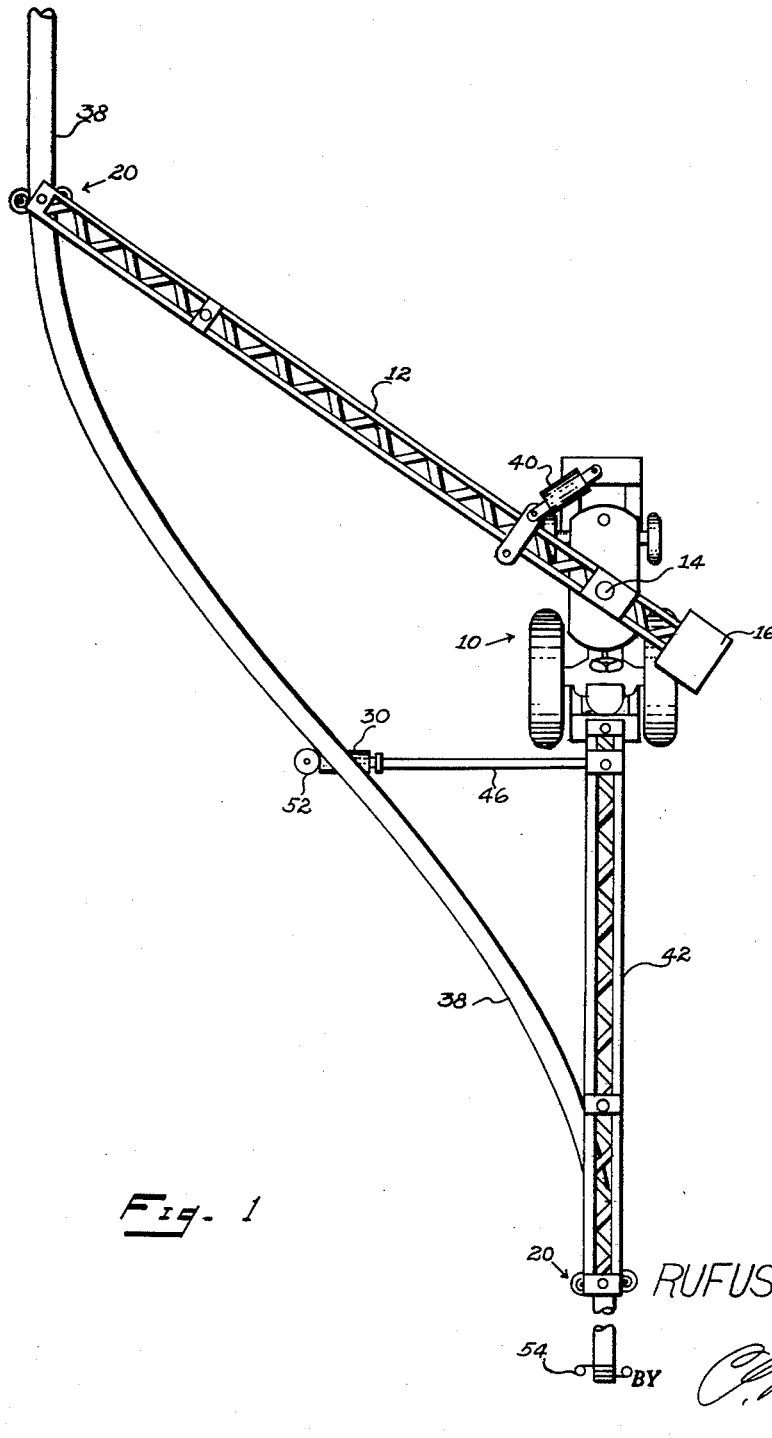
FIG. 1 is a plan view of an embodiment of this invention.

As may be seen in the accompanying drawings, particularly referring to FIG. 1, this invention is adapted to be attached to a standard farm tractor or vehicle 10 of conventional design which supports the various elements. The vehicle has obvious means for propelling it parallel to the first position of the pipe. Pivoted to the frame of the vehicle is a forward extending boom 12. The boom is pivoted at 14 near one end thereof. The pivot is a universal pivot so that the boom is free to move not only horizontally but within certain limits, vertically about the pivot point. The boom is counterbalanced by weight 16 at one end. Adjacent the other end of the boom there is a ground engaging wheel 18 to support the boom and the pipe line as will be explained later. The ground engaging wheel is supported by column 22. The column is generally vertical and mounted so that the wheel is free to caster about the vertical axis thereof. Also the column is adjustable (not shown) so that the end of the boom may be supported at a greater or lesser height above the ground as dictated by the height of growing crops. The boom is made of light weight construction preferably of welded aluminum tubing. At the end of the boom opposite counterbalancing weight 16 there is a roller guide assembly 20.

Referring to FIG. 4, the roller guide assembly includes a vertically disposed shaft 24 which is journaled for rotation about its axis to the end of the boom 12. Attached at the lower end of the shaft 24 is a plate 26. Two shafts 28 are mounted in the plate and depend therefrom. The shafts 28 are mounted equal distance from the axis of the shaft 24. Each shaft carries on it a large pneumatic roller 30. These are known to the art and are sometimes referred to as "rollogons." They are of rubber composition much the same as an automobile tire except of far greater axial length.

At the bottom of each shaft 28 is a pillow block 32 mounted thereon. Connected between the two pillow blocks 32 the shaft 34 which carries a third pneumatic roller 36.

It may be seen that by these elements, a means for supporting the pipe line 38 is provided. The pipe line is supported in an elevated position by the roller 36 and maintained aligned with its first or original position by the two roillers 30.

It will be understood that the pillow blocks 32 may be connected by U-shaped support members to plate 26 if desired. Likewise, they may be connected together if so desired. Also it may be seen that any type rollers could be used, however, the type filled with air is preferred because they are softer and have less possibility of damaging the light aluminum pipe line.

The forward boom is maintained in the proper angular relationship to the tractor by means of a hydraulic cylinder-piston 40 interconnected between the front of the tractor and the boom. By the fact that the boom is pivoted at 14 the boom may be used on either side of the tractor by the simple expedient of connecting the hydraulic piston to the other side of the boom.

Attached to the rear of the tractor and pulled behind it is a trailer 42. It is rigidly attached to the rear of the tractor and extends directly behind it. Likewise, near the end of the trailer is the ground engaging wheel 44. Like the ground engaging wheel 18 it is mounted upon a column attached to the trailer so that height of the trailer above the ground may be adjusted. Also the wheel is mounted to caster to turn about freely about a vertical axis so that it always follows the direction of the movement of the trailer at that point. At the end of the beam is mounted rear roller guide 20. This roller guide is identical with the roller guide mounted upon the end of the boom 12.

It is desirable to provide support for the pipe line in its elevated position between the two roller guides 20.

Therefore, I attach a side boom 46 to the trailer immediately behind the point the trailer is attached to the tractor. The side boom is mounted in a manner not shown to lock in two positions, either of which is lateral of the tractor but one of which is to the right and the other to the left. The boom is rigidly mounted so that the end of the boom is in elevated position above the ground. On the end of the boom there is a support roller 50 mounted to rotate about a horizontal axis. I find it desirable to provide roller 52 at the extreme end of the side boom 46 mounted to rotate about a vertical axis.

Operation

The tractor is aligned with the position to which it is desired that the pipe line be moved. In a typical operation this will be 30 to 50 feet from the position the pipe is in before moving and parallel thereto. The end of the pipe is inserted through the forward roller guide on the end of boom 12. The boom is adjusted by means of the cylinder-piston 40 to be aligned with the first position of the pipe. As the tractor is advanced the pipe is flexed or bent over and supported by the roller 50 and inserted through the rear roller guide on the trailer 42. As seen in the drawing the pipe makes a smooth curve from the forward roller guide where it is threaded through the after roller guide. This would not necessarily be so in practice because the position of the greatest flexibility of the line will occur in the couplings. As the tractor is advanced the end of the pipe will bend until it touches the ground. A stake 54 is driven into the ground aligned with the second position and the end of the pipe attached by lashing to it. Therefore, it may be seen that as the tractor advances through the field the forward roller guide picks the pipe up, however, maintaining it aligned with the first position so that as the pipe is raised it does not drag across growing crops. The pipe is maintained in an elevated position by the middle roller 50 and also by the support roller 36 of the rear roller guide. The rear roller guide will shift the pipe over or transport it so that it is aligned with its second position and thereafter it is permitted to move downward to the ground by gravity.

Thus, it may be seen that I have provided a system whereby with the use of the valve (explained later) the water is emptied from the pipe, the pipe is progressively elevated, transported to a second position, and then lowered to the ground in the second position. After the entire length of the pipe has been transported it may be filled with water aand the irrigation procedure resumed. Sprinklers are attached to the pipe to sprinkle irrigation water from the pipe.

Second Embodiment

FIG. 6 shows a second embodiment. It likewise is adapted to be mounted on a standard farm tractor or vehicle 10 of conventional design. A pivot is established about the middle of the tractor by attaching it to the frame of the tractor. Pivoted into this point is boom 56. The boom is mounted upon the tractor pivot for rotation vertically, i.e., that the ends may rock up and down. Also the boom may be locked in either one of three positions. One with the counter weight to the right lateral to the tractor, the other weight to the left lateral of the tractor, a third position aligned with the tractor. It may be placed in the third position for moving the equipment from one field to another. In any of the three positions it is locked into position. Since this is a simple mechanical contrivance well within the skill of the art it is not illustrated in detail. The boom is provided with a support wire 64 which is attached to either end of the boom. The center of this wire is supported by a mast 66 which extends vertically upward from the center of the boom. The boom is counterbalanced on one end by weight 57. On the opposite end is pivoted a long horizontal beam 58. Adjacent each end of the beam is a ground engaging wheel 60 mounted for adjustment as to height by the column 62. The ground engaging wheels 60 are made to caster.

A roller guide assembly 20 identical with that described in the previous embodiment is mounted on each end of the beam. They are depended by the shaft 24 as in the previous embodiment. A middle roller guide 20 is also attached at the middle of the beam, i.e., under the point of pivoting the beam to the boom.

The angulation of the beam is controlled by hydraulic cylinder piston assembly 68.

It may be seen readily that the beam may be operated on either side of the tractor. It is shown to the left of the tractor in the direction in which the tractor is shown, FIG. 6. To mount it on the other side (right) all that is necessary is to swing the boom to the opposite side of the tractor and to adjust the piston cylinder 68 so that the forward roller guides can be at the correct distance to one side of the tractor and the rear roller guide assembly is directly behind the tractor.

As may be seen in both embodiments the tractor is operated aligned with the line located in the second position. The tractor operates on dry ground.

FIG. 5 illustrates the valve 70 which would be located in the bottom of the pipe. Such valves are well known to the art. With the pressure in the pipe, the rubber of which the valve is constructed will give enough to seal the hole in the bottom of the pipe. However, if the pressure is released in the pipe the natural resilience of the rubber will cause the valve to spring upward from the bottom of the pipe so that the hole in the bottom thereof is open to allow drainage of the water.

Many and various modifications may be made. The beam as shown in FIG. 6 may be connected directly to the vehicle and the vehicle operated half way between the first position of the pipe and the second position of the pipe. In such an arrangement it might be desirable to have the sprinklers on the pipe set so that they always sprinkle to one side of the line, therefore, leaving dry ground on the other side of the line. Likewise, to support the pipe in the middle it might be desirable only to use a horizontal roller and have it mounted above the beam rather than below as shown in the drawing.

Also, it might be found desirable with some vehicles to mount a colter forward or rearward of the tractor to resist the turning moment on the tractor caused by the reaction of the pipe on the tractor.

Either at the joints or in the line itself it will be understood that the pipe line itself is flexible. This does not mean to say that it is pliable but the line is flexible enough to make the turns as shown necessary to operate in the system. The individual lengths of pipe are joined together by couplings to form the line. Nearly all the bending will occur at the couplings which are designed to permit misalignment. The couplings are connected during the move.

It will be apparent that the embodiments shown are only exemplary and that various modifications can be made in construction, materials, and arrangement within the scope of the invention as defined in the appended claims.

I claim as my invention:

1. In a system for moving a flexible pipe line from a first position resting on the ground to a second position resting on the ground parallel to the first position, the improvement comprising:
   (a) a vehicle,
   (b) means connected to the vehicle for propelling the vehicle parallel to the first position,
   (c) a boom connected between its ends to the vehicle extending laterally of the vehicle,
   (d) a counter balance weight on one end of the boom,
   (e) a beam connected approximately at its mid-point to the other end of the boom,
   (f) means interconnecting the beam and the boom for maintaining them at a fixed angular relationship, and (g) a roller guide at each end of the beam.

2. The invention as defined in claim 1 with the addition of a ground engaging wheel adjacent each end of the beam to maintain the roller guides at the proper elevation above the ground.

3. The invention as defined in claim 1 with the addition of a middle roller located at the middle of the beam for supporting the pipe between the end guide rollers.

4. The invention as defined in claim 1 wherein the roller guides include at least one vertical and at least one horizontal pneumatic roller.

5. In a system for moving flexible pipe line from its first position resting on the ground to the second position resting on the ground parallel to the first position, the improvement comprising:

(a) a vehicle,
(b) means connected to the vehicle for propelling the vehicle parallel to the pipe line,
(c) a forward boom pivoted to the vehicle,
(d) means for swinging said forward boom to either side of the vehicle,
(e) a roller guide at the end of the boom,
(f) said roller guide elevated above the ground and offset laterally to one side of the vehicle,
(g) said roller guide further from the vehicle than the length of the vehicle itself,
(h) a trailer connected to and towed behind the vehicle,
(i) said trailer including a ground engaging support wheel, and
(j) a roller guide mounted on the trailer above the ground level at the end of the trailer,
(k) whereby the pipe line may be elevated by the first roller guide on the end of the boom and moved to its second position by the roller guide on the trailer.

References Cited in the file of this patent

UNITED STATES PATENTS

| | | |
|---|---|---|
| 1,943,152 | Weiss | Jan. 9, 1934 |
| 2,559,703 | Bergman | July 10, 1951 |
| 2,909,134 | Kniefel | Oct. 20, 1959 |